United States Patent
Karri et al.

(10) Patent No.: US 12,423,146 B2
(45) Date of Patent: Sep. 23, 2025

(54) MULTI-DEVICE PROCESSING ACTIVITY ALLOCATION

(71) Applicant: INTERNATIONAL BUSINESS MACHINES CORPORATION, Armonk, NY (US)

(72) Inventors: Venkata Vara Prasad Karri, Visakhapatnam (IN); Sarbajit K. Rakshit, Kolkata (IN); Sowjanya Rao, Hyderabad (IN); Shailendra Moyal, Pune (IN); Akash U. Dhoot, Pune (IN)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 17/399,633

(22) Filed: Aug. 11, 2021

(65) Prior Publication Data

US 2023/0046403 A1 Feb. 16, 2023

(51) Int. Cl.
G06F 9/50 (2006.01)
G06F 11/00 (2006.01)
G06N 20/00 (2019.01)

(52) U.S. Cl.
CPC .......... *G06F 9/5027* (2013.01); *G06F 9/5094* (2013.01); *G06F 11/008* (2013.01); *G06N 20/00* (2019.01)

(58) Field of Classification Search
None
See application file for complete search history.

(56) References Cited

U.S. PATENT DOCUMENTS

| 11,526,386 B2 * | 12/2022 | Srivastava .......... G06F 9/45558 |
| 2008/0222646 A1 * | 9/2008 | Sigal ....................... G06F 9/505 718/105 |

(Continued)

FOREIGN PATENT DOCUMENTS

| CN | 106291174 A | 1/2017 |
| WO | 2018017271 A1 | 1/2018 |

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

(Continued)

*Primary Examiner* — Charles E Anya
(74) *Attorney, Agent, or Firm* — CHIP LAW GROUP

(57) ABSTRACT

Allocating processing activities among multiple computing devices can include identifying multiple computing activities of a computer-executable process and, for each computing activity identified, estimating in real time the computing resources needed. The identifying can be in response to detecting a computer-executable instruction executed by one multiple communicatively coupled computing devices, and the computer-executable instruction can be associate with the computer-executable process. A current condition and configuration of each of the computing devices can be determined in real time. For each computing device an effect induced by executing one or more of the plurality of activities can be predicted, the predicting based each computing device's current condition and configuration and performed by a machine learning model trained using data collected from prior real-time processing of example process activities. Based on the predicting, computing activities can be allocated in real time among the computing devices.

20 Claims, 5 Drawing Sheets

(56) References Cited

U.S. PATENT DOCUMENTS

| | | | | |
|---|---|---|---|---|
| 2010/0257531 | A1* | 10/2010 | Barsness | G06F 9/4893 |
| | | | | 718/100 |
| 2011/0213508 | A1* | 9/2011 | Mandagere | G06F 9/5088 |
| | | | | 700/291 |
| 2014/0325521 | A1* | 10/2014 | Li | G06F 9/5038 |
| | | | | 718/104 |
| 2015/0193325 | A1 | 7/2015 | Harsan-Farr et al. | |
| 2018/0027057 | A1* | 1/2018 | Balle | H04Q 1/09 |
| | | | | 709/226 |
| 2019/0042408 | A1* | 2/2019 | Schmisseur | H04L 45/28 |
| 2021/0184916 | A1* | 6/2021 | Ramanujan | G06F 11/0793 |
| 2022/0261661 | A1* | 8/2022 | Khaligh | G06Q 10/0631 |

OTHER PUBLICATIONS

"Dynamic reconfiguration based on system health and cost," IP.com Prior Art Database Technical Disclosure, No. PCOM000019276D, Sep. 9, 2003, 5 pg.

Martin, A., "Negative Effects of an Overheated Laptop," [online] Hearst Newspapers © 2021 [retrieved May 21, 2021], retrieved from the Internet: <https://smallbusiness.chron.com/causes-processor-heat-up-66866.html>, 5 pg.

Bolchini, C. et al., "Lifetime-aware Load Distribution Policies in Multi-core Systems: An In-Depth Analysis," In 2016 Design, Automation & Test in Europe Conference & Exhibition (DATE), Mar. 14, 2016, pp. 804-809, IEEE.

* cited by examiner

MULTI-DEVICE PROCESSING ACTIVITY ALLOCATION

BACKGROUND

This disclosure relates to data processing using computing devices, and more particularly, to performing data processing using multiple networked computing devices.

Data processing can be performed using multiple computing devices that are communicatively coupled via one or more computer networks, such as a local area network (LAN), a wide area network (WAN), the Internet, or other type of data communications network. Networked computing devices are not limited to merely sharing data but can be operatively coupled to cooperatively perform separate tasks that jointly comprise a computer program or computing process. In various arrangements, different types of computing devices can be operatively coupled with one another for cooperatively performing various data processing tasks.

SUMMARY

In one or more embodiments, a method includes identifying multiple computing activities of a computer-executable process and, for each computing activity identified, estimating in real time the computing resources required for executing the computing activity on a computing device. The computing activities are identified in response to detecting a computer-executable instruction executed by one of a plurality of communicatively coupled computing devices, the computer-executable instruction associated with the computer-executable process. The method includes determining in real time a current condition and configuration of each of the communicatively coupled computing devices. The method includes predicting for each computing device an effect induced by executing one or more of the computing activities on the computing device, the predicting based on the current condition and configuration of the computing device and performed by a machine learning model trained using data collected from prior real-time processing of example computing activities. The method includes allocating each of the computing activities among the communicatively coupled computing devices based on the effect predicted for each of the communicatively coupled computing devices.

In one or more embodiments, a system includes a processor to initiate operations. The operations include identifying multiple computing activities of a computer-executable process and, for each computing activity identified, estimating in real time the computing resources required for executing the computing activity on a computing device. The computing activities are identified in response to detecting a computer-executable instruction executed by one of a plurality of communicatively coupled computing devices, the computer-executable instruction associated with the computer-executable process. The operations include determining in real time a current condition and configuration of each of the communicatively coupled computing devices. The operations include predicting for each of the communicatively coupled computing devices an effect induced by executing one or more of the plurality of activities on the computing device, the predicting based on the current condition and configuration of the computing device and performed by a machine learning model trained using data collected from prior real-time processing of example computing activities. The operations include allocating each of the computing activities among the communicatively coupled computing devices based on the effect predicted for each of the communicatively coupled computing devices.

In one or more embodiments, a computer program product includes one or more computer readable storage media having instructions stored thereon. The instructions are executable by a processor to initiate operations. The operations include identifying multiple computing activities of a computer-executable process and, for each computing activity identified, estimating in real time the computing resources required for executing the computing activity on a computing device. The computing activities are identified in response to detecting a computer-executable instruction executed by one of a plurality of communicatively coupled computing devices, the computer-executable instruction associated with the computer-executable process. The operations include determining in real time a current condition and configuration of each of the communicatively coupled computing devices. The operations include predicting for each of the communicatively coupled computing devices an effect induced by executing one or more of the plurality of activities on the computing device, the predicting based on the current condition and configuration of the computing device and performed by a machine learning model trained using data collected from prior real-time processing of example computing activities. The operations include allocating each of the computing activities among the communicatively coupled computing devices based on the effect predicted for each of the communicatively coupled computing devices.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
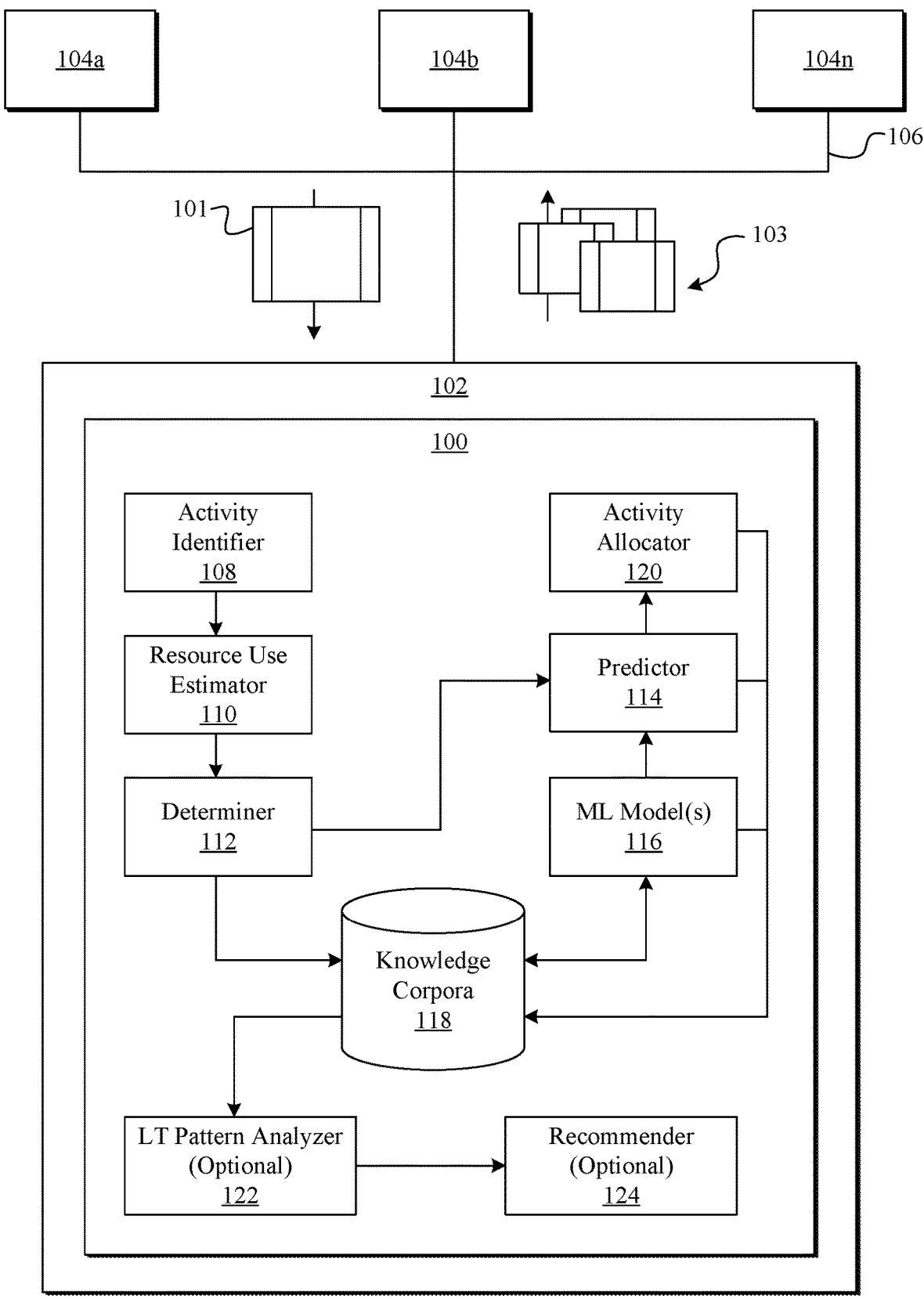
FIG. 1 is a block diagram of an example system for allocating among multiple computing devices the execution of separate computing activities of a computer-executable process.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to data processing using computing devices, and more particularly, to performing data processing using multiple networked computing devices. In any multi-device environment, one or more of the computing devices may be overutilized while one or more others remain underutilized. An overutilized computing device is unable to provide processing support for other priority processing activities. Moreover, overutilization can impose undue stress on the computing device's hardware components and can impede the computer device's performance. For example, intense use of a computing device can cause hardware degradation owing to the generation of inordinate amounts of heat, which also can slow the functioning of the processor of the computing device. While using an internal fan can mitigate the effects of heat on the computing device, intensive use of the fan from overutilization of the computing device gives rise to other problems, namely the noise generated by the fan and the distractions to a user engendered by the noise.

An aspect of the systems, methods, and computer program products disclosed herein is the allocation of processing activities in a multi-device environment to mitigate overutilization of any one of multiple, communicatively coupled computer devices. As defined herein, an "activity" is a set of one or more computer-executable instructions that are executed by the computer to perform an operation or task that is an element of a computer process. Computing activity is essentially any computer-executable activity in which computing resources (e.g., one or more processors, memory) are used to complete a computer-implemented task or process, such as rendering video content, facilitating an online meeting, and performing various other types of data processing. Activities are also performed with computer-controlled equipment, such as industrial machinery. Relatedly, "computer process" is defined herein to include the complete set of computer-executable instructions for performing the tasks, functions, and/or operations of a computer program. Dynamically distributing processing activities among operatively coupled computing devices provides distinct benefits, including mitigating damage to hardware components, enhancing software-based data processing performance, and generally improving life expectancy of the different computing devices.

Another aspect is the use of artificial intelligence to allocate activities among multiple communicatively coupled computing devices. Specifically, in certain arrangements, various machine learning models are trained to predict with respect to each computing device an effect on the computing device of allocating to the computing device one or more computing activities of a computer process. The effect predicted, for example, can be the amount of computing resources (e.g., CPU usage, memory storage) utilized by each computing device in executing one or more of the activities. The effect predicted can be, for example, the heat generated by each computing device in executing one or more of the computing activities. The predictions can be based on device-specific factors such as the current condition and/or configuration of each computing device. A condition can be an operating condition such as the other computing activities currently being executed by each computing device, for example. Another operating condition, for example, is the percentage of processing capability currently utilized by each computing device in processing the other computing activities currently being executed. A condition can be a historically based condition corresponding to the physical condition of the hardware components of each computing device, for example, determined based on processing logs and servicing reports.

A machine learning model can be trained using the data collected from prior real-time processing of the same or similar activities of the same or similar computer processes. For example, supervised learning can be used to train a machine learning model to perform a regression that yields an expected level of heat generated by a computer device in executing a specific computing activity given factors specific to the computing device such as the age of the computing device and/or the other activities currently executing on the computing device.

Still another aspect of the arrangements disclosed herein is allocating processing activities among multiple computing devices based on one or more machine learning model predictions to enhance the efficiency and/or mitigate deleterious effects of processing a plurality of activities of a computer process. For example, the activities can be allocated to enhance efficiency by avoiding overutilization of any one of the multiple computing devices. The activities can be allocated, for example, to mitigate the heat generated by the computing devices, thereby reducing the likelihood of damaging the hardware of the computing devices and enhancing the expected life span of the computing devices. The activities can be allocated to mitigate, for example, fan noise likely to disturb a user during execution of a computer process, such as when the user is viewing video content.

Yet another aspect is tracking the predicted effects and, based on a discernable pattern, determining the likelihood of damage to one or more hardware components. Based on the likelihood, a service agreement recommendation can be generated. The recommendation can specify which of a set of available service agreements (e.g., annual maintenance contracts) most likely covers anticipated damage to or replacement of hardware components of the multiple computing devices.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 2:
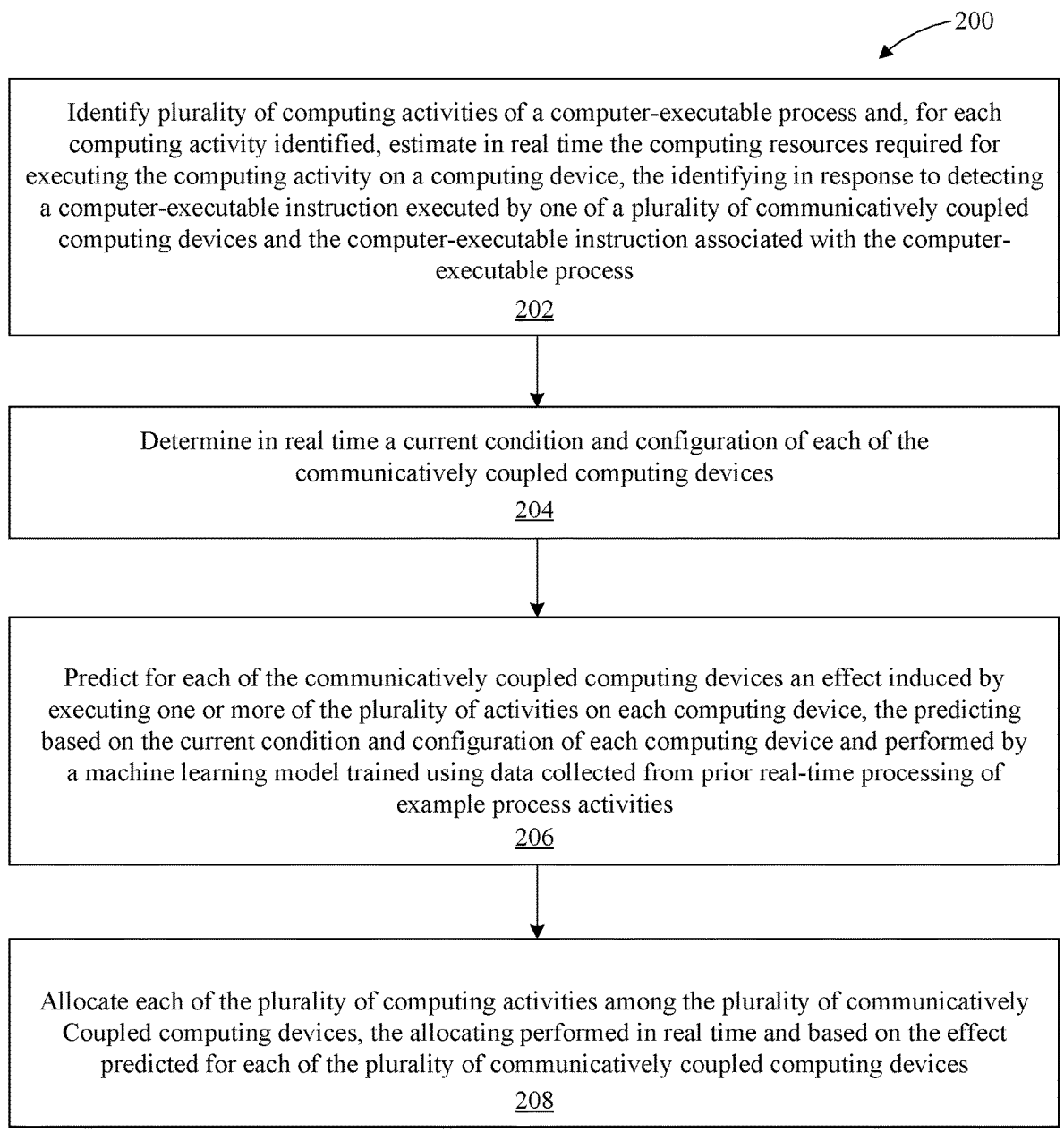
FIG. 2 is a flowchart illustrating an example process implemented by the system of FIG. 1.
Figure 3:
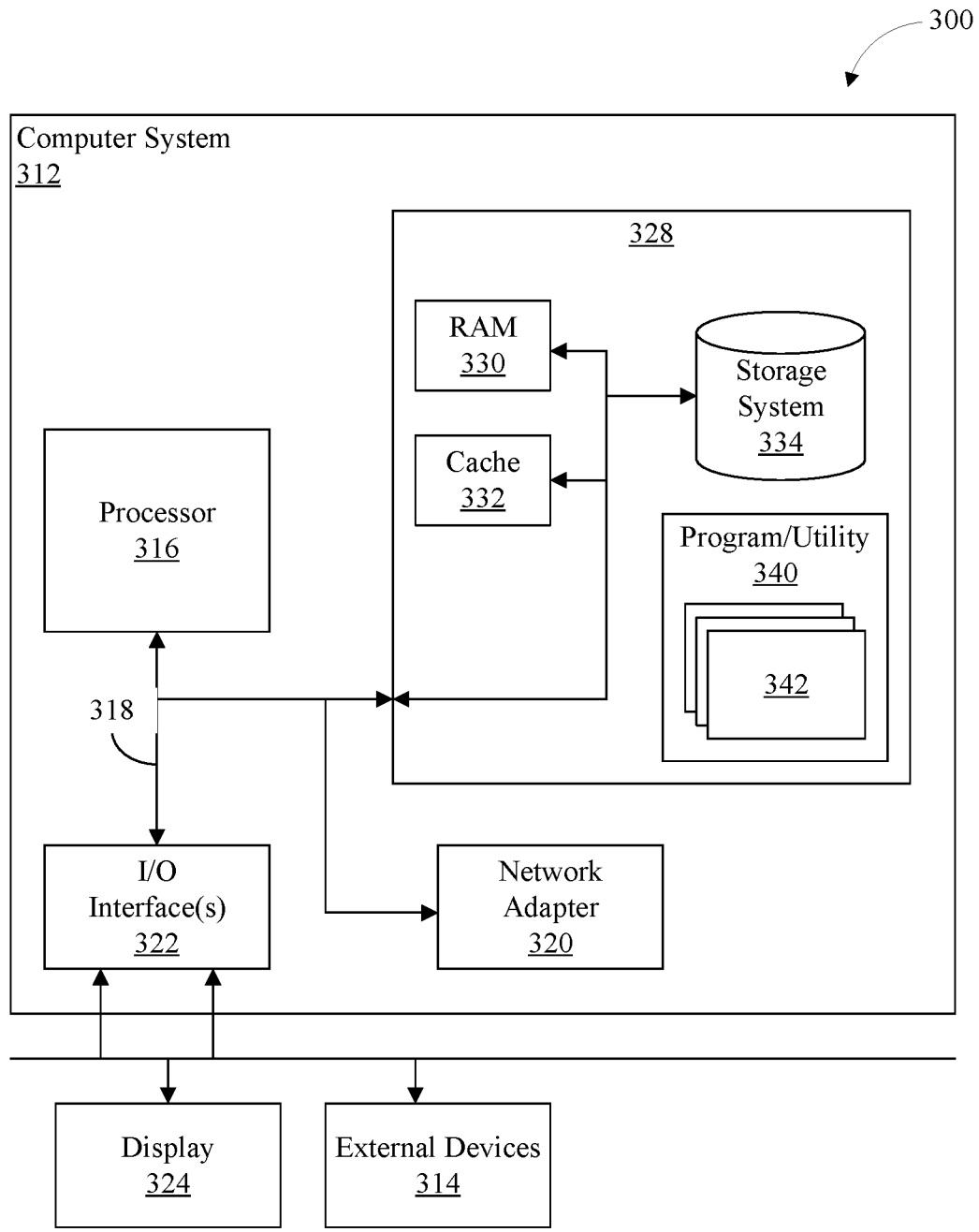
FIG. 3 is a block diagram of example computer hardware for implementing the system of FIG. 1.

FIGS. 1 and 2, respectively, illustrate example processing activity allocation system (system) 100 and methodology 200, which implements certain operative aspects of system 100. System 100 can be implemented in hardware (e.g., in dedicated circuitry), software (e.g., in program code executed by one or more processors), or a combination thereof. Illustratively, system 100 is implemented within computing device 102, which is communicatively coupled with computing devices 104a, 104b, and 104n. Computing device 102, as well as computing devices 104a, 104b, and 104n, can each comprise computing nodes such as the example computing nodes described herein (FIG. 3). Although shown communicatively coupled with three computing devices, it will be readily apparent that computing device 102 can communicatively couple via wired and/or wireless connections with more or fewer computing devices than the computing devices shown. Computing devices 102 and 104a-104n are illustratively connected via communication network 106. Communication network 106 can be a LAN, WAN, the Internet, or other type of communication network or a combination of such networks.

Illustratively, system 100 identifies distinct activities 103 that comprise computer-executable process 101, system 100 allocating the different activities 103 among communicatively coupled computing devices 104a-104n. Certain operative features of system 100 are invoked in response to execution of a computer-executable instruction by one of computing devices 104a-104n, the computer-executable instruction being one of the set of instructions corresponding to computer-executable process 101. The executable instruction can be initiated, for example, by a user input or a system call by a running process.

At block 202, activity identifier 108 of system 100 responds by identifying one or more computing activities of a computer-executable process. In various arrangements, system 100 collects data and identifies the processor-executable actions, or sequence of processing steps, performed in completing various computer-executable processes. System 100 compiles the identified data to create a knowledge corpus for identifying, in real time, the same or similar computing activities that are performed in completing the same or similar computer-executable processes. For example, with respect to a computer-controlled metal cutting process, activity identifier 108 identifies computing activities for the same or a similar—the similarity, based on a statistically determined correlation—computer-executable process, the identified computer-executable process and corresponding computing activities identified among ones stored electronically in the knowledge corpus. Activity identifier 108 can also identify each of computing devices 104a-104n by detecting the communicative coupling of each computing device with other computing device(s). Resource use estimator 110 estimates the computing resources required for executing each computing activity on a computing device. Activity identifier 108 can identify the computing activities and resource use estimator 110 can estimate the needed computing resources in real time. Resource use estimator 110 can estimate the needed computing resources, for example, based on factors such as the number and complexity of the computer-executable instructions of an activity, lines of code, amount of memory allocation, and/or other processing-related factors.

At block 204, determiner 112 of system 100 determines a current condition and configuration of each computing device 104a-104n communicatively coupled with one another. The current condition of each computing device 104a-104n can be a physical hardware condition determined based on electronically stored data that includes the computing device's age, processing logs, servicing reports (e.g., hardware component replacement), and the like. The current condition can be an operational condition associated with other computing activities of other computer-executable processes running on the computing device.

At block 206, predictor 114 predicts an effect induced in each computing device 104a-104n in response to executing one or more activities 103 of computer-executable process 101. Predictor 114 generates a prediction for each communicatively coupled computing device 104a-104n. Each prediction of predictor 114 is based on the current condition and configuration of each computing device 104a-104n as determined by determiner 112. The predicted effect can be, for example, a predicted increase in the amount of CPU usage needed to execute one or more of the activities. For example, the effect can be a predicted increase in heat generated by a computing device, given the current condition and configuration of the computing device, in executing one or more of computing activities 103. The effect, for example, can be a predicted increase in fan noise generated as result of executing one or more of computing activities 103.

Predictor 114, in various arrangements makes predictions using artificial intelligence, machine learning, and/or computer-implemented statistical methods (e.g., multivariate linear or polynomial regression). For example, in certain arrangements, predictor 114 implements one or more machine learning models 116. Predictor 114 can train one or more machine learning models, for example, using supervised and/or unsupervised learning. In certain arrangements, the machine learning model is trained using data comprising a knowledge corpus selected from electronically stored knowledge corpora 118. In performing supervised learning, the data used for training the machine learning model can be structured to represent a collection of labeled examples $\{x_i, y_i\}_{i=1}^{N}$, in which the $x_i$ are feature vectors whose elements correspond to predefined features, based on which the model makes predictions by preforming a regression or classification. The corresponding $y_i$ are labels corresponding to correct predictions and can be vectors, each element belonging to a finite class $\{1, 2, \ldots, C\}$, a real number, or more complex data structure (e.g., matrix, tree, graph).

With supervised learning, the model is iteratively trained by refining the model's parameters until the model predicts the example targets with an acceptable level of accuracy in response to inputting into the model the corresponding feature vectors. In performing unsupervised learning, the data comprises only the feature vectors $x_i$, and the model is trained to recognize an input (feature vector) as belonging to one of a set of identified clusters or groupings of data based on the features of the input vector. In other arrangements, predictor 114 can implement other types of machine learning models trained, for example, using semi-supervised learning, reinforcement learning, or other algorithms.

At block 208, activity allocator 120 allocates each of the plurality of activities of the computing process, allocating the activities among computing devices 104a-104n based on the predicted effect of the activities on each of computing devices 104a-104n. Activity allocator 120 can allocate activities according to different criteria based on different predicted effects, the different effects varying depending on the machine learning model used by predictor 114. Optionally, system 100 can electronically store multiple allocation criteria and corresponding prediction-based machine learning models 116. A user can select a specific criterion and corresponding machine learning model 116 by inputting a system-recognized command via an input/output (I/O) interface (e.g., keyboard, voice command).

In certain arrangements, activity allocator 120 allocates a plurality of activities of a computer-executable process to minimize heat generated by computing devices 104a-104n in executing computing activities 103. Accordingly, the effect predicted by predictor 114 is heat generation corresponding to execution of each activity. Predictor 114 thus makes predictions based on a machine learning model specifically trained to predict heat generation resulting from the processing of certain activities given the processing computer's condition and configuration. The machine learning model is trained using feature vectors whose elements comprise features corresponding to the hardware of the computing device and the software comprising the activity. For example, the hardware-related features can include age of the computer, configuration, data derived from processing logs and service reports, and other hardware-related features. Hardware features related specifically to computing device configuration, for example, can include processor type, processor clock speed, number of cores/processors, amount and/or type of RAM/runtime memory, number and/or type of expansion cards/peripherals, amount and/or type of non-volatile memory/disk space, and the like. Software-related features can include amount of memory allocation, lines of code, and other software-related features.

Using supervised learning, for example, the machine learning model can be trained using example feature vectors whose labels correspond to an effect such as heat generated during processing. Thus, based on feature vector inputs, for example, the machine learning model can predict generated heat or other effect induced in each computing device by processing one or computing activities. The machine learning model, for example, can be a regression model that generates a real number (e.g., measured heat or other measure) in response to inputs (feature vectors) whose features represent software aspects (e.g., memory, code) and hardware aspects corresponding to the activity to be allocated and the computing device to which the activity can be allocated. By identifying each of the activities to be executed and the communicatively coupled computing devices available to perform execution, system 100 can allocate the computing activities.

For example, in certain arrangements, in which predictor 114 predicts the generation of heat induced in the computing devices owing to processing one or more computing activities, the computing activities can be allocated by activity allocator 120 to minimize heat generated. For example, the allocation can minimize heat generated in a single computing device by allocating the computing activity to the computing device expected to perform the computing activity with a minimal amount of heat generated. Alternatively, activity allocator 120 can allocate different activities across different computing devices such that total heat across all of the computing devices is minimized for a given computing process.

In other arrangements, for example, activity allocator 120 allocates a plurality of activities of a computer-executable processor to minimize fan noise generated by computing devices 104a-104n in executing computing activities 103. Again, using supervised learning, a machine learning model used by predictor 114 can be trained to predict the level of fan noise in response to inputs whose features correspond to the activities to be allocated and the communicatively coupled computing devices to which the activities can be allocated.

In certain arrangements, activity identifier 108 discovers, based on identifying the computing activities of a computer-executable process, a computing activity having an audio element. As defined herein, "audio element" means rendering content as sound and/or receiving sound during execution of the computing activity. For example, the audio element can comprise an HTML element that embeds sound within an HTML document. The audio element, for example, can comprise the audio portion of video content rendered on one of computing devices 104a-104n. For example, the audio element can be voice content received by a user and conveyed by the user during video conferencing.

Responsive to discovering the audio element, activity allocator 120 can allocate the computing activities such that the audio element is rendered by one of the communicatively coupled computing devices and processing of other elements of the activity are performed by other of the plurality of communicatively coupled computing devices. Activity allocator 120 can allocate both the audio element and the other corresponding processing activities such that fan noise predicted by predictor 114 is minimized with respect to each communicatively coupled computing device involved in executing a process that includes a computing activity having an audio element.

System 100 optionally includes long-term pattern analyzer 122. Data generated by determiner 112, predictor 114, and activity allocator 120 is collected over time and electronically stored as one corpus of knowledge corpora 118. Long-term pattern analyzer 122 analyzes the data and based on various historical data on computing device hardware components predicts a likelihood of failure for one or more components of each of computing devices 104a-104n. For example, based on heat generation over time of each of computing devices 104a-104n, long-term pattern analyzer 122 generates a probability of failure of select components of one or more of computing devices 104a-104n. By repeated identifying, determining, and predicting for each of computing device 104a-104n an effect induced by executing one or more computing activities, long-term pattern analyzer 122 can determine a likelihood of damage to one or more of computing devices 140a-104n.

Optionally, system 100 also can include recommender 124. Recommender 124 can generate recommendations of terms to include in a service agreement to cover the likelihood of failure, based on the probabilities determined by long-term pattern analyzer 122, of a computing device or component. In certain arrangements, an updatable corpus electronically stored in knowledge corpora 118 includes current service agreement offerings. Based on patterns of likely computer device or component failure, recommender 124 generates a service agreement recommendation that is calculated to mitigate maintenance and repair costs associated with computing devices 104a-104n.

One or more of computing devices 104a-104n may include one or more hardware components and/or firmware for which there is no communication protocol or other mechanism for conveying data indicating a certain or likely failure of the hardware component(s) and/or firmware and thus the computing device(s) are incapable of providing data needed to predict a failure. Accordingly, in certain arrangements, determiner 112 is further discovers whether one or more of computing devices 104a-104n includes a hardware component or firmware incapable of conveying an indication of actual or likely operational failure. For example, knowledge corpus 118 can contain a corpus of information listing hardware components and firmware of each computing device. An automatic search of the corpus can be made by system 100 in response to the identifying of computing activities 103 by activity identifier 108. Of computing devices 104a-104n, a data structure identifying each (if any) that includes the discovered hardware component(s) and firmware can be flagged to indicate a corresponding possibility of failure.

In response to the discovering of hardware component(s) and/or firmware incapable of conveying an indication of actual or likely operational failure, predictor 114 predicts a likelihood of failure of each computing device that includes the discovered hardware component(s) and/or firmware. Predictor 114 makes the prediction based on determining a current condition of each computing device whose identity is flagged. The current condition on which the prediction is based is identified by a digital twin simulation of the hardware component(s) and/or firmware. An entire workflow sequence can be simulated, and based on the workflow simulation, a determination made as to which devices are likely to generate what amount of heat and the like, as well as which devices and/or components are likely to be damaged, and which resource allocation in a multi-device environment is most likely optimal. The digital twin simulation can identify one or more conditions corresponding to a likely operational failure of a device and/or component(s). The identification is made based on the digital twin, a virtual object, which provides a virtual model that accurately reflects the performance of the physical object(s), namely, the hardware component(s) and/or firmware. The virtual object (digital twin) can be analyzed using data derived from different aspects of the corresponding physical object's performance under various simulated operating conditions.

Machine learning models 116 can include a model trained to predict an operational failure of one or more of the hardware components or firmware of one or more computing devices 104a-104n based on the condition identified by a digital twin simulation as associated with a certain or likely operational failure. Determiner 112 can determine the presence of the condition of computing devices 104a-104n whose identify is flagged, and predictor 114 can make a prediction regarding the likelihood of operation failure prior to the allocating of activities by activity allocator 120. Accordingly, one criterion for allocating processing activities with activity allocator 120 is reduction of the likelihood of operational failure.

System 100, in still other arrangements, can obtain data generated by one or more sensors (not shown) embedded in, or located within predetermined distances of, each of computing devices 104a-104n. The data generated by the sensors can correspond to environmental parameters, such as ambient temperature, light intensity, or other condition corresponding to the environments in which each computing device is operating. The data corresponding to environmental parameters can be additional to other inputs to system 100 for allocating processing activities among computing devices 104a-104n.

In predicting an effect induced in each computing device by allocating to each computing device 104a-104n one or more processing activities 103, predictor 114 can make the prediction based additionally on the environmental parameter(s) associated with the environment in which each computing device is operating. For example, an elevated ambient temperature may cause an increase in predicted heat and, therefore, increased fan noise. Similarly, for example, the brightness of ambient light may hinder viewing a video on rendered on a computing device display. Thus, responsive to activity identifier 108 identifying a processing activity involving an audio or video rendering, for example, predictor 114 can predict the effect of noise and/or light on the rendering of audio or video. Accordingly, activity allocator 120 can allocate the plurality of activities such that heat generated by the plurality of computing devices in executing the plurality of computing activities is minimized to reduce fan noise and/or to avoid light interference with a video rendering on the display of one or more of computing devices 104a-104n.

For example, with respect to a user watching a movie rendered on a computing device, system 100 can decouple audio activity from video activity and allocate video activity to one computing device to avoid light interference and allocate to another computing device the audio activity to mitigate noise interference. Communicatively coupled devices, in various arrangements, can include various Internet of Things (IoT) elements that can play a role in activity allocation by system 100. For example, system 100 can respond to a situation in which a computing device (e.g., laptop computer) performing an activity that generates a significant amount of heat is likely to create excessive noise due to the running of a fan of the device by controlling the ambient temperature through an operatively coupled IoT air conditioner (AC). Specifically, system 100 can turn on the IoT AC to lower the temperature of the room in which the computing device is operating, thereby reducing usage of the computing device's fan and mitigating noise interference.

FIG. 3 illustrates a schematic of an example of a computing node 300. In one or more embodiments, computing node 300 is an example of a cloud-based computing node. Computing node 300 is not intended to suggest any limitation as to the scope of use or functionality of embodiments of the invention described herein. Computing node 300 is capable of performing any of the functionality described within this disclosure.

Computing node 300 includes a computer system 312, which is operational with numerous other general-purpose or special-purpose computing system environments or configurations. Examples of well-known computing systems, environments, and/or configurations that may be suitable for use with computer system 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 312 may be described in the general context of computer system-executable instructions, such as program modules, being executed by a computer system. Generally, program modules may include routines, programs, objects, components, logic, data structures, and so on that perform particular tasks or implement particular abstract data types. Computer system 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 312 is shown in the form of a general-purpose computing device. The components of computer system 312 may include, but are not limited to, one or more processors 316, a memory 328, and a bus 318 that couples various system components including memory 328 to processor 316. As defined herein, "processor" means at least one hardware circuit to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 318 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 312 typically includes a variety of computer system-readable media. Such media may be any available media that is accessible by computer system 312, and may include both volatile and non-volatile media, removable and non-removable media.

Memory 328 may include computer system readable media in the form of volatile memory, such as random-access memory (RAM) 330 and/or cache memory 332. Computer system 312 may further include other removable/non-removable, volatile/non-volatile computer system storage media. By way of example, storage system 334 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. For example, one or more of the program modules can include a processing activity allocation system such as system 100 or portions thereof.

Program/utility 340 is executable by processor 316. Program/utility 340 and any data items used, generated, and/or operated upon by computer system 312 are functional data structures that impart functionality when employed by computer system 312. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via I/O interfaces 322. Still, computer system 312 can communicate with one or more networks such as a local area network (LAN), a general wide area network (WAN), and/or a public network (e.g., the Internet) via network adapter 320. As depicted, network adapter 320 communicates with the other components of computer system 312 via bus 318. It should be understood that although not shown, other hardware and/or software components could be used in conjunction with computer system 312. Examples, include, but are not limited to: microcode, device drivers, redundant processing units, external disk drive arrays, RAID systems, tape drives, and data archival storage systems, etc.

While computing node 300 is used to illustrate an example of a cloud computing node, it should be appreciated that a computer system using an architecture the same as or similar to that described in connection with FIG. 3 may be used in a non-cloud computing implementation to perform the various operations described herein. In this regard, the example embodiments described herein are not intended to be limited to a cloud computing environment. Computing node 300 is an example of a data processing system. As defined herein, "data processing system" means one or more hardware systems processing data, each hardware system including at least one processor programmed to initiate operations and memory.

Computing node 300 is an example of computer hardware. Computing node 300 may include fewer components than shown or additional components not illustrated in FIG. 3 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 300 is also an example of a server. As defined herein, "server" means a data processing system that share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
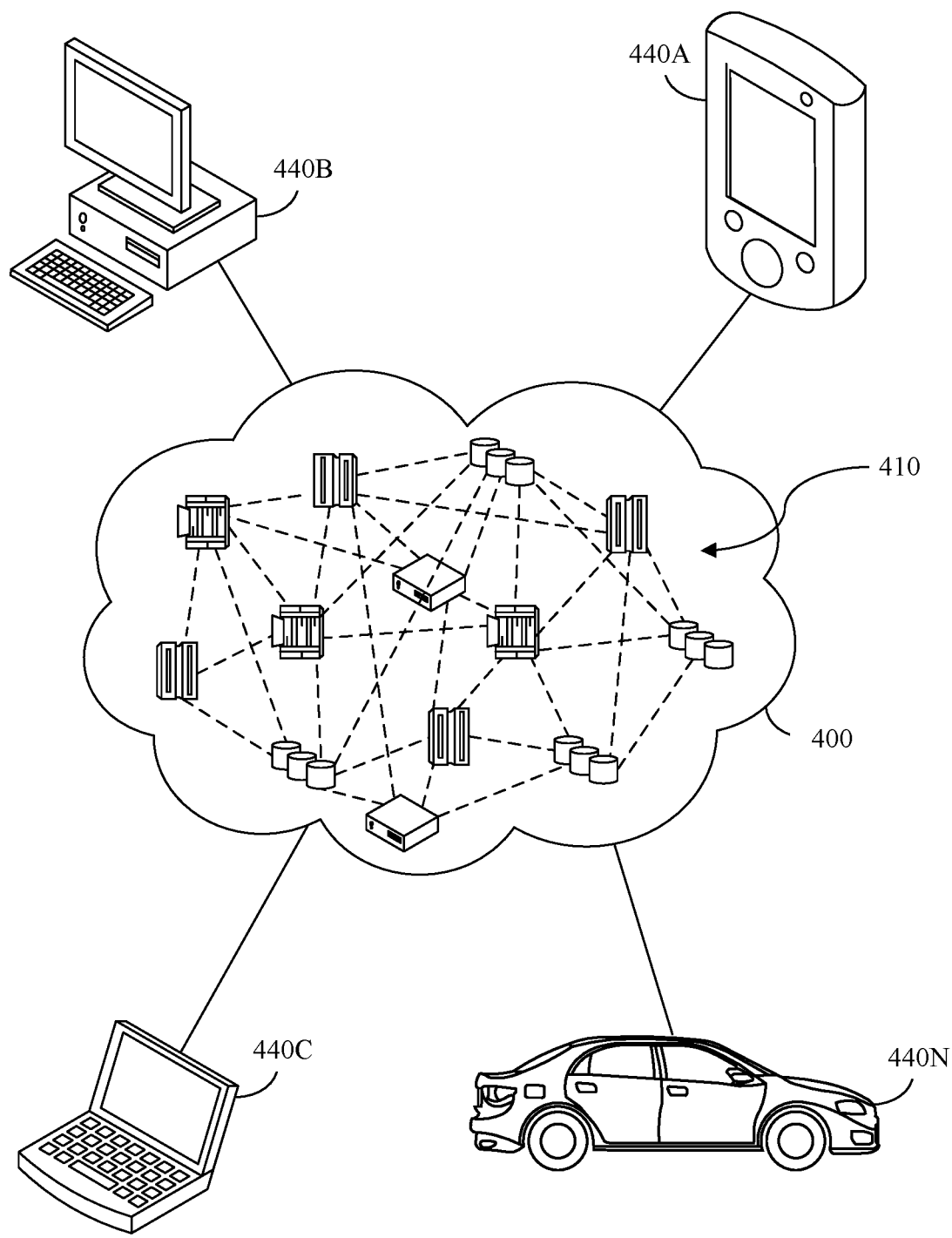
FIG. 4 is a block diagram of an example cloud environment.

Referring now to FIG. 4, illustrative cloud computing environment 400 is depicted. As shown, cloud computing environment 400 includes one or more cloud computing nodes 410 with which local computing devices used by cloud consumers, such as, for example, personal digital assistant (PDA) or cellular telephone 440a, desktop computer 440b, laptop computer 440c, and/or automobile computer system 440n may communicate. Computing nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 440a-n shown in FIG. 4 are intended to be illustrative only and that computing nodes 410 and cloud computing environment 400 can communicate with any type of computerized device over any type of network and/or network addressable connection (e.g., using a web browser).

Figure 5:
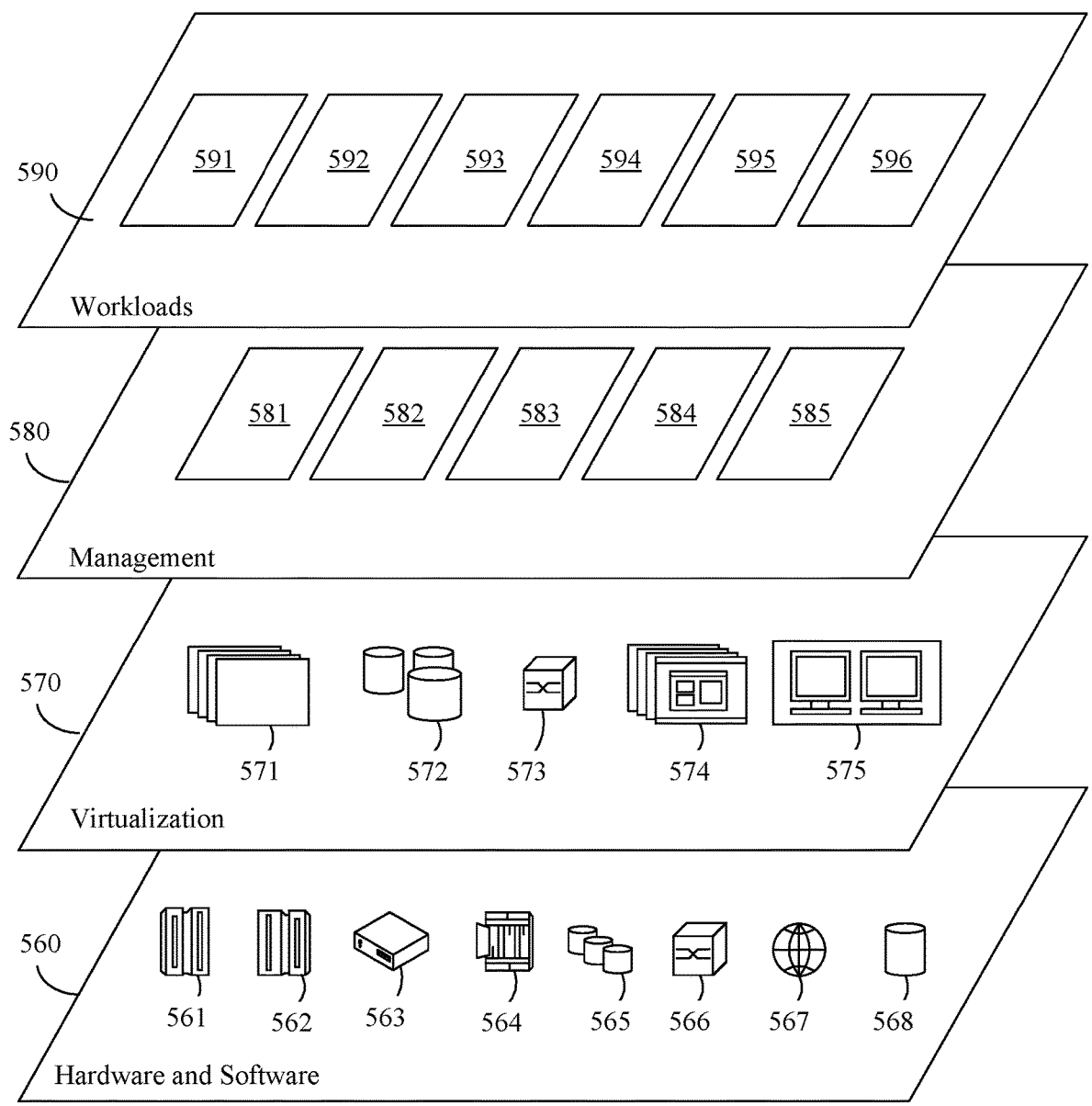
FIG. 5 is a block diagram of example abstraction model layers of the cloud computing environment of FIG. 4.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include mainframes 561; RISC (Reduced Instruction Set Computer) architecture-based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and processing activity allocation system 596, which can be the same or similar to example system 100.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" refers to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   identifying, with computer hardware, for a computer-executable process, a plurality of computing activities of the computer-executable process based on a detection of a computer-executable instruction used to perform the computer-executable process, wherein
      the computer-executable instruction is executed by one of a plurality of communicatively coupled computing devices;
   estimating, in real-time, for each computing activity of the plurality of computing activities, computing resources required for executing a respective computing activity of the plurality of computing activities on a computing device of the plurality of communicatively coupled computing devices;
   determining, in real-time, a current condition and configuration of each of the plurality of communicatively coupled computing devices;
   receiving, from a user, an allocation criterion and a selection of a machine learning model from a plurality of machine learning models, wherein
      the allocation criterion is associated with an effect of a plurality of effects,
      each machine learning model of the plurality of machine learning models corresponds to a respective effect of the plurality of effects, and
      the selected machine learning model corresponds to the allocation criterion;
   predicting, for each of the plurality of communicatively coupled computing devices and using the selected machine learning model, the effect induced by executing one or more of the plurality of computing activities on the computing device, based on the current condition and configuration of the computing device; and
   allocating, in real-time, based on the allocation criterion and the predicted effect for each of the plurality of communicatively coupled computing devices, each of the plurality of computing activities among the plurality of communicatively coupled computing devices, wherein
the machine learning model is trained based on data collected from prior real-time processing of example computing activities.

2. The method of claim 1, wherein
the effect, the machine learning model is trained to predict, is heat generated by each computing device of the plurality of communicatively coupled computing devices in the execution of each computing activity of the plurality of computing activities; and
the allocating, based on the predicting, allocates the plurality of computing activities to minimize heat generated by the plurality of communicatively coupled computing devices in the execution of the plurality of computing activities.

3. The method of claim 1, further comprising:
discovering, based on the identifying of the plurality of computing activities, a computing activity having an audio element; and
performing the allocating, by allocating the plurality of computing activities such that the audio element is rendered by one of the plurality of communicatively coupled computing devices and processing of other elements of the computing activity are performed by a different communicatively coupled computing device of the plurality of communicatively coupled computing devices.

4. The method of claim 1, wherein
the effect, the selected machine learning model is trained to predict, is fan noise generated by each computing device of the plurality of communicatively coupled computing devices in the execution of each computing activity of the plurality of computing activities; and
the allocating, based on the predicting, allocates the plurality of computing activities to minimize the predicted fan noise generated by the plurality of communicatively coupled computing devices in the execution of the plurality of computing activities.

5. The method of claim 1, further comprising:
repeating the identifying, the determining, and the predicting of the effect induced on each computing device of the plurality of communicatively coupled computing devices by executing one or more computing activities, other than the plurality of computing activities, of processes other than the computer-executable process and recording resulting effects over a predetermined time interval;
further predicting, based on the resulting effects, damage occurring to each computing device of the plurality of communicatively coupled computing devices; and
based on the further predicting, generating a service agreement recommendation.

6. The method of claim 1, wherein
the determining of the current condition of each computing device of the plurality of communicatively coupled computing devices is based on at least one of an age of each computing device of the plurality of communicatively coupled computing devices, processing logs generated by each computing device of the plurality of communicatively coupled computing devices, one or more service reports generated for each computing device of the plurality of communicatively coupled computing devices, or a percentage of processing capability currently utilized by each computing device of the plurality of communicatively coupled computing devices.

7. The method of claim 1, further comprising:
determining, for each of the plurality of communicatively coupled computing devices, an environmental parameter indicating a condition of an environment within which each computing device of the plurality of communicatively coupled computing devices is operating;
performing the predicting, of the effect induced in each computing device of the plurality of communicatively coupled computing devices, based additionally on the environmental parameter associated which each computing device of the plurality of communicatively coupled computing devices is operating; and
performing the allocating based at least in part on the environmental parameter associated which each computing device of the plurality of communicatively coupled computing devices.

8. The method of claim 1, wherein
the predicting further comprises:
predicting, for each computing device of the plurality of communicatively coupled computing devices, an expected reduction in life expectancy of each computing device of the plurality of communicatively coupled computing devices.

9. The method of claim 1, further comprising:
discovering, within the plurality of communicatively coupled computing devices, a hardware component or firmware incapable of conveying an indication of actual or likely operational failure; and
predicting a likelihood of failure of one of the plurality of communicatively coupled computing devices based on the discovering of the hardware component or the firmware and the determining of the current condition of the computing device, wherein the current condition is identified by a digital twin simulation of the hardware component or the firmware as a condition corresponding to the operational failure.

10. A system, comprising:
a processor configured to:
identify, for a computer-executable process, a plurality of computing activities of the computer-executable process based on a detection of a computer-executable instruction used to perform the computer-executable process, wherein
the computer-executable instruction is executed by one of a plurality of communicatively coupled computing devices;
estimate, in real-time, for each computing activity of the plurality of computing activities, computing resources required to execute a respective computing activity of the plurality of computing activities on a computing device of the plurality of communicatively coupled computing devices;
determine, in real-time, a current condition and configuration of each of the plurality of communicatively coupled computing devices;
receive, from a user, an allocation criterion and a selection of a machine learning model from a plurality of machine learning models, wherein
the allocation criterion is associated with an effect of a plurality of effects,
each machine learning model of the plurality of machine learning models corresponds to a respective effect of the plurality of effects, and the selected machine learning model corresponds to the allocation criterion;

predict, for each of the plurality of communicatively coupled computing devices and using the selected machine learning model, the effect induced by execution of one or more of the plurality of computing activities on the computing device, based on the current condition and configuration of the computing device; and allocate, in real-time, based on the allocation criterion and the predicted effect for each of the plurality of communicatively coupled computing devices, each of the plurality of computing activities among the plurality of communicatively coupled computing devices, wherein the machine learning model is trained based on data collected from prior real-time processing of example computing activities.

11. The system of claim 10, wherein
the effect, the machine learning model is trained to predict, is heat generated by each computing device of the plurality of communicatively coupled computing devices in the execution of each computing activity of the plurality of computing activities; and the allocation, based on the prediction, allocates the plurality of computing activities to minimize heat generated by the plurality of communicatively coupled computing devices in the execution of the plurality of computing activities.

12. The system of claim 10, wherein the processor is further configured to:
discover, based on the identification of the plurality of computing activities, a computing activity having an audio element; and perform the allocation, by allocation of the plurality of computing activities such that the audio element is rendered by one of the plurality of communicatively coupled computing devices and processing of other elements of the computing activity are performed by a different communicatively coupled computing device of the plurality of communicatively coupled computing devices.

13. The system of claim 10, wherein
the effect, the machine learning model is trained to predict, is fan noise generated by each computing device of the plurality of communicatively coupled computing devices in the execution of each computing activity of the plurality of computing activities; and the allocation, based on the prediction, allocates the plurality of computing activities to minimize the predicted fan noise generated by the plurality of communicatively coupled computing devices in the execution of the plurality of computing activities.

14. The system of claim 10, wherein the processor is further configured to:
repeat the identification, the determination, and the prediction of the effect induced on each computing device of the plurality of communicatively coupled computing devices by execution of one or more computing activities, other than the plurality of computing activities, of processes other than the computer-executable process and record resulting effects over a predetermined time interval;

further predict, based on the resulting effects, damage to each computing device of the plurality of communicatively coupled computing devices; and based on the further prediction, generate a service agreement recommendation.

15. The system of claim 10, wherein
the determination of the current condition of each computing device of the plurality of communicatively coupled computing devices is based on at least one of an age of each computing device of the plurality of communicatively coupled computing devices, processing logs generated by each computing device of the plurality of communicatively coupled computing devices, one or more service reports generated for each computing device of the plurality of communicatively coupled computing devices, or a percentage of processing capability currently utilized by each computing device of the plurality of communicatively coupled computing devices.

16. The system of claim 10, wherein the processor is further configured to:
determine, for each of the plurality of communicatively coupled computing devices, an environmental parameter indicating a condition of an environment within which each computing device of the plurality of communicatively coupled computing devices operates;

perform the prediction, of the effect induced in each computing device of the plurality of communicatively coupled computing devices, based additionally on the environmental parameter associated which each computing device of the plurality of communicatively coupled computing devices operates; and perform the allocation based at least in part on the environmental parameter associated which each computing device of the plurality of communicatively coupled computing devices.

17. The system of claim 10, wherein
the prediction further comprises:
predict, for each computing device of the plurality of communicatively coupled computing devices, an expected reduction in life expectancy of each computing device of the plurality of communicatively coupled computing devices.

18. The system of claim 10, wherein the processor is further configured to:
discover, within the plurality of communicatively coupled computing devices, a hardware component or firmware incapable of conveying an indication of actual or likely operational failure; and predict a likelihood of failure of one of the plurality of communicatively coupled computing devices based on the discovery of the hardware component or the firmware and the determination of the current condition of the computing device, wherein the current condition is identified by a digital twin simulation of the hardware component or the firmware as a condition corresponding to the operational failure.

19. A computer program product, the computer program product comprising:
one or more computer-readable storage media and program instructions collectively stored on the one or more computer-readable storage media, the program instructions executable by a processor to cause the processor to initiate operations including:

identifying, for a computer-executable process, a plurality of computing activities of the computer-executable process based on a detection of a computer-executable instruction used to perform the computer-executable process, wherein
the computer-executable instruction is executed by one of a plurality of communicatively coupled computing devices;

estimating, in real-time, for each computing activity of the plurality of computing activities, computing resources required for executing a respective computing activity of the plurality of computing activities on a computing device of the plurality of communicatively coupled computing devices;

determining, in real-time a current condition and configuration of each of the plurality of communicatively coupled computing devices;

receiving, from a user, an allocation criterion and a selection of a machine learning model from a plurality of machine learning models, wherein
- the allocation criterion is associated with an effect of a plurality of effects,
- each machine learning model of the plurality of machine learning models corresponds to a respective effect of the plurality of effects, and
- the selected machine learning model corresponds to the allocation criterion;

predicting, for each of the plurality of communicatively coupled computing devices and using the selected machine learning model, the effect induced by executing one or more of the plurality of computing activities on the computing device, based on the current condition and configuration of the computing device; and allocating, in real-time, based on the allocation criterion and the predicted effect for each of the plurality of communicatively coupled computing devices, each of the plurality of computing activities among the plurality of communicatively coupled computing devices, wherein
- the machine learning model is trained based on data collected from prior real-time processing of example computing activities.

20. The computer program product of claim 19, wherein
the effect, the machine learning model is trained to predict, is heat generated by each computing device of the plurality of communicatively coupled computing devices in the execution of each computing activity of the plurality of computing activities; and the allocating, based on the predicting, allocates the plurality of computing activities to minimize heat generated by the plurality of communicatively coupled computing devices in the execution of the plurality of computing activities.

* * * * *